Figure 1:
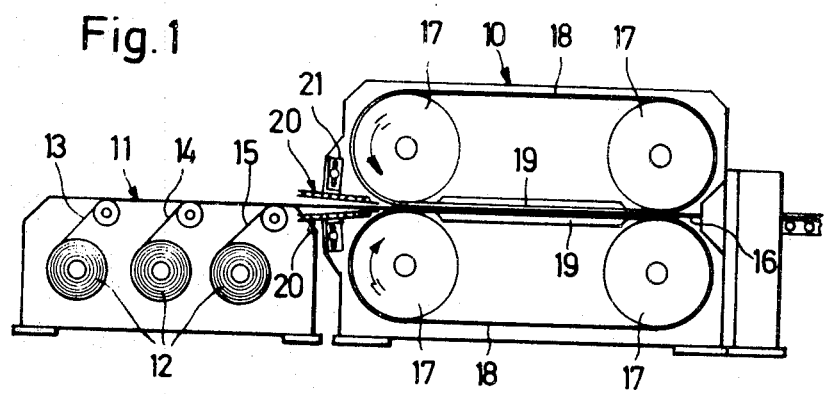

United States Patent [19]

Dedekind

[11] 4,336,096
[45] Jun. 22, 1982

[54] BELT PRESS APPARATUS WITH HEAT SHIELD

[75] Inventor: Gerd Dedekind, Bielefeld, Fed. Rep. of Germany

[73] Assignee: Theodor Hymmen KG, Bielefeld, Fed. Rep. of Germany

[21] Appl. No.: 243,647

[22] Filed: Mar. 13, 1981

[30] Foreign Application Priority Data

Mar. 22, 1980 [DE] Fed. Rep. of Germany ....... 3011217

[51] Int. Cl.³ .......................... B30B 5/06; B30B 15/34
[52] U.S. Cl. .............................. 156/498; 100/93 RP; 100/154; 156/555; 156/583.5; 425/371
[58] Field of Search ............ 100/93 RP, 154; 156/498, 555, 583.5; 425/371

[56] References Cited

U.S. PATENT DOCUMENTS

| 2,972,369 | 2/1961 | Jensen | 156/555 X |
| 3,536,567 | 10/1970 | Harrison | 156/498 |
| 3,840,420 | 10/1974 | Sarcia | 100/93 RP X |
| 3,926,542 | 12/1975 | Ahrweiler | 100/154 X |
| 4,080,241 | 3/1978 | Grevich et al. | 156/498 |
| 4,186,797 | 2/1980 | Guttinger et al. | 100/154 X |
| 4,283,246 | 8/1981 | Held | 156/555 |

Primary Examiner—Edward C. Kimlin
Assistant Examiner—Robert A. Dawson
Attorney, Agent, or Firm—Spencer & Kaye

[57] ABSTRACT

In an apparatus for joining a plurality of band-shaped layers of material in passage wherein rotating steel belts (18) for pressing together the laminates are heated, the apparatus being designed as a dual belt press (10), a heat damming protective shield is disposed at the intake side both above and below the cover layers (13, 15), said protective shields being designed as cooling pockets (20) and being adjustably fastened to the dual belt press (10). The cooling pockets (20) may be designed in such a manner that a coolant can flow therethrough and the cover layers (13, 15) are shielded from the radiation heat of the steel belts (18) until very near the pressing region of the guide rollers (17).

9 Claims, 4 Drawing Figures

U.S. Patent  Jun. 22, 1982  4,336,096

BELT PRESS APPARATUS WITH HEAT SHIELD

The invention relates to an apparatus for joining a plurality of band-shaped layers of material while passing through a dual belt press equipped with rotating heatable steel belts in which the layers of material can be pressed together under the influence of heat.

Dual belt presses are used to continuously press together laminates from two, three or more layers of material passing therethrough. Generally, such laminates comprise a core layer, for example of vulcanized fibers, and one or two cover layers of paper saturated with an aminoplast resin. It is known to operate such systems with narrow operating widths up to 650 mm. The layers of material are here not only compressed by the rotating steel belts of the dual belt press but are also heated. The steel belts have a temperature of about 160° C.

When the individual layers are heated and pressed between the steel belts, the influence of heat produces contraction pressure in the individual layers or in the composite laminate and this contraction pressure is connected with a decrease in moisture. Connected with the contraction is a reduction in the width of the layer of material with an absolute value which is greater the greater the operating width of the machine. With widths of more than 650 mm, contraction has such an adverse effect that good quality laminates can no longer be produced. Already before the compressive force is applied at the entrance side of the dual belt press, the outer layers of the laminate to be produced are heated by the heat radiation from the steel belts. The layers relinquish part of their moisture content and begin to contract prematurely. The core layer becomes subject to the influence of the heat at a later time because the upper and lower cover layers protect it against the heat radiating steel belts. Therefore it begins to contract later. During operation, the differences in contraction of the layers in the laminate to be produced results in undesirable waviness of the laminate.

It is the object of the invention to prevent premature heating of the outer layers of material entering into the dual belt press so as to subject all layers of material to the treatment heat at the same time and to thus prevent wave formation in the laminate by uniform contraction.

This is accomplished according to the invention in that at the inlet side of the dual belt press between each steel belt and the adjacent layer of material a protective shield is disposed which acts as a dam for the radiation heat of the steel belt over its entire width.

In order to prevent the heat protection shield from being heated by the steel belt after longer periods of operation, to then transmit heat radiation to the adjacent layer of material, the protective shield is preferably designed as a cooling pocket through which flows a coolant.

Preferred embodiments of the invention are defined in the claims. The protective range covered by the invention extends not only to the claimed individual features but also to combinations thereof.

Figure 2:
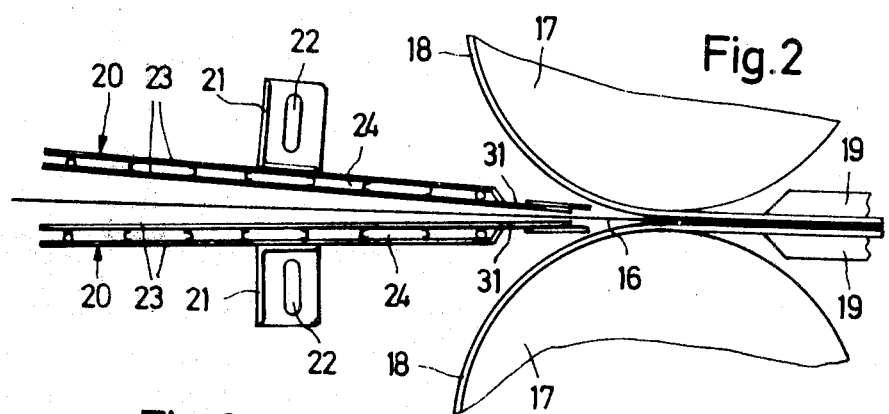
Figure 3:
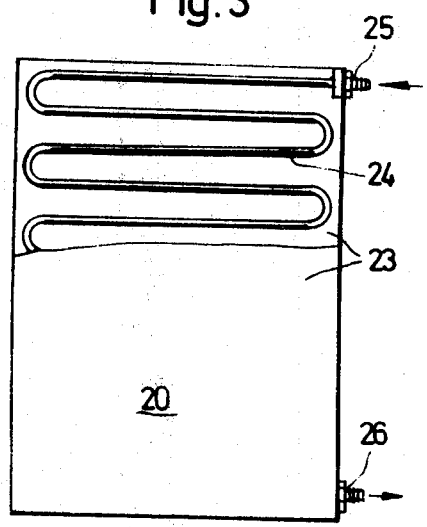
Figure 4:
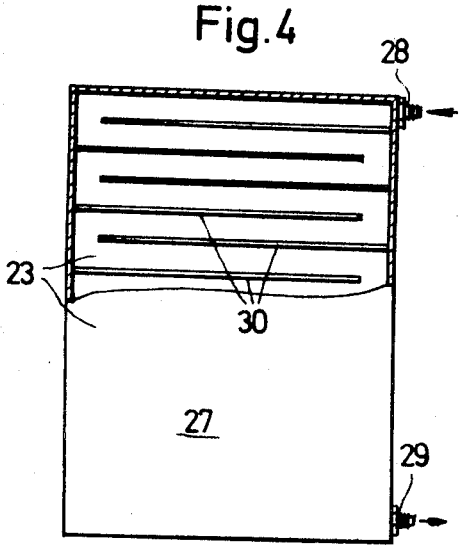

One embodiment of the invention is illustrated in the drawing and will be described in greater detail below. It is shown in:

FIG. 1, a schematic side view of a dual belt press having an upstream unwinding station for a plurality of layers of material;

FIG. 2, an enlarged illustration of the intake region of the dual belt press;

FIG. 3, a cooling pocket with a pipe coil as the coolant conduit;

FIG. 4, a cooling pocket with guide metals for the coolant.

The apparatus according to the invention includes a dual belt press 10 and an unwinding station 11 equipped with three supply reels 12 for an upper cover layer 13, a core layer 14 and a lower cover layer 15 as the layers of material which are to be combined in the dual belt press 10 to form a joint laminate 16.

The dual belt press 10 includes four guide rollers 17, a steel belt 18 being tensioned around the two lower guide rollers 17 and another steel belt 18 around the two upper guide rollers 17. The guide rollers 17 move the steel belts 18 between which the layers of material 13 through 15 are pressed together in the dual belt press 10 with the aid of pressure bars 19. Simultaneously, the layers of material 13 through 15 are subjected to the heat of the heated steel belts 18.

In order to prevent the outer layers of material, i.e. the upper cover layer 13 and the lower cover layer 15, from being heated by the heat radiated from the steel belts 18 before the layers enter the dual belt press, two cooling pockets 20 are attached at the intake side of the dual belt press 10 to act as heat protection shields. These cooling pockets extend over the entire width of the incoming layers of material 13 through 15. They are releasably fastened to the machine frame of the dual belt press 10 by means of fastening angles 21 and can be adjusted at the dual belt press 10 with the aid of long holes 22 provided in the fastening angles 21.

Each cooling pocket 20 consists of two parallel metal sheets 23 which are arranged at a distance from one another. A pipe coil 24 having an entry opening 25 and an exit opening 26 for the coolant, for example water, is disposed, according to FIG. 3, between the metal sheets 23. Radiation heat emitted by a steel belt 18 to the adjacent metal sheet 23 of the cooling pocket 20 is thus dissipated through the pipe coil 24 and can no longer be transmitted to the adjacent metal sheet 23 of the cooling pocket 20. The cover layers 13 through 15 of the laminate to be produced are thus protected from the heat radiation of the steel belts 18 at the entry side of the dual belt press 10.

According to FIG. 4 of the drawing, a cooling pocket 27 is likewise constructed of two parallel metal sheets 23, each in the form of a closed container having an entrance opening 28 and an exit opening 29. Within this cooling pocket 28, a plurality of parallel guide metals 30 are arranged to act as baffles around which the coolant, for example air, must flow. The radiation heat emitted by the steel belt 18 to the adjacent sheet 23 is here likewise dissipated through the coolant so that the sheet of the cooling pocket 27 facing the material layers 13 through 15 cannot be heated.

Thus it is assured with the cooling pockets 20 and 27 according to the invention that, upon entry into the dual belt press 10, the upper cover layer 13, the core layer 14 and the lower cover layer 15 are subjected to the influence of heat at the same time.

In order to counteract the heat radiation of the belts 18 directed toward the cover layers 13, 14 as long as possible until they come close to the pressing range of the guide rollers 17, the sheets 23 of the cooling pockets 20 facing the cover layers 13, 14 are made longer in the intake region and form a heat dissipating lip 31 of equal width. This lip 31 conducts the received heat into the cheets 23 of the cooling pockets 20 in those regions where the cold coolant is introduced through entrance openings 25, 28 and forms the most effective cooling zones.

These effective cooling zones can additionally be set to the respective room temperature due to the fact that the oblique position of the cooling pockets 20 is adjustable by means of the long holes 22 so that, independent of coolant or coolant flow, respectively, the cooling effect on the cover layers 13, 14 can be varied by means of a greater or lesser inclination of the cooling pockets 20.

I claim:

1. Apparatus for joining a plurality of band-shaped layers of material while passing through a dual belt press equipped with rotating steel belts wherein the layers of material can be pressed together under the influence of heat, characterized in that at the intake side of the dual belt press, between each steel belt and the adjacent layer of material, there is disposed a protective shield which dams the heat radiated from the steel belt over the entire width of the belt.

2. Apparatus according to claim 1, characterized in that the protective shield is designed as a cooling pocket through which flows a coolant.

3. Apparatus accordng to claim 2, characterized in that each cooling pocket is constructed of two parallel, spaced metal sheets.

4. Apparatus according to claim 3, characterized in that in the space between the two sheets there is disposed a pipe coil which is in contact with said sheets and through which flows the coolant.

5. Apparatus as defined in any of claims 2, 3 and 4 characterized in that each cooling pocket is designed as a container having an entrance opening and an exit opening for the coolant, a plurality of parallel guide metals being arranged in the area between the two sheets.

6. Apparatus according to any of claims 2, 3, and 4, characterized in that the cooling pockets are mounted to be variable in their inclination by means of an adjustment device such as fastening angles provided with long holes.

7. Apparatus according to claim 3, characterized in that, in the intake region on the side facing the cover layer, the sheets are extended to form a heat dissipating lip.

8. Apparatus according to claim 5, characterized in that the entrance openings in the cooling pockets (20) for the coolant are disposed in the area of the guide rollers for the belts.

9. Apparatus according to claim 5, characterized in that the cooling pockets are mounted to be variable in their inclination by means of an adjustment device such as fastening angles provided with long holes.

* * * * *